United States Patent
Lee et al.

(10) Patent No.: US 9,616,757 B2
(45) Date of Patent: Apr. 11, 2017

(54) METHOD AND APPARATUS FOR CONTROLLING REGENERATIVE BRAKING OF VEHICLE

(71) Applicant: Hyundai Motor Company, Seoul (KR)

(72) Inventors: Jun Yong Lee, Gyeonggi-Do (KR); Min Young Jung, Gyeonggi-Do (KR); Dae Kwang Kim, Gyeonggi-Do (KR)

(73) Assignee: Hyundai Motor Company, Seoul (KR)

(*) Notice: Subject to any disclaimer, the term of this patent is extended or adjusted under 35 U.S.C. 154(b) by 46 days.

(21) Appl. No.: 14/542,613

(22) Filed: Nov. 16, 2014

(65) Prior Publication Data

US 2015/0336458 A1 Nov. 26, 2015

(30) Foreign Application Priority Data

May 20, 2014 (KR) .................. 10-2014-0060457

(51) Int. Cl.
    *B60L 7/26* (2006.01)
    *B60T 8/172* (2006.01)
    (Continued)

(52) U.S. Cl.
CPC ........ *B60L 7/26* (2013.01); *B60L 7/14* (2013.01); *B60L 7/18* (2013.01); *B60L 11/14* (2013.01); *B60L 11/1861* (2013.01); *B60L 15/2009* (2013.01); *B60L 15/2045* (2013.01); *B60L 15/2054* (2013.01); *B60T 8/172* (2013.01); *B60L 2210/40* (2013.01);
(Continued)

(58) Field of Classification Search
CPC .................................. B60W 10/06; B60L 7/26
See application file for complete search history.

(56) References Cited

U.S. PATENT DOCUMENTS

| 6,177,773 B1* | 1/2001 | Nakano | B60K 6/28 180/65.26 |
| 2006/0022519 A1* | 2/2006 | Ji | B60K 6/48 303/152 |
| 2011/0276209 A1* | 11/2011 | Suganuma | B60W 10/06 701/22 |

FOREIGN PATENT DOCUMENTS

| JP | 08-126116 A | 5/1996 |
| JP | 2001-054203 A | 2/2001 |

(Continued)

*Primary Examiner* — Todd Melton
*Assistant Examiner* — Jason Roberson
(74) *Attorney, Agent, or Firm* — Mintz Levin Cohn Ferris Glovsky and Popeo, P.C.; Peter F. Corless

(57) ABSTRACT

A method and apparatus for controlling regenerative braking of a vehicle are provided. The method of controlling regenerative braking of a vehicle includes: receiving information regarding the scheduled driving route from a path information providing device, estimating a regenerable segment based on the information regarding the scheduled driving route and calculating a regenerable energy amount based on the regenerable segment, calculating a dischargeable energy amount based on the regenerable energy amount and setting a dischargeable segment and a discharge control amount based on the dischargeable energy amount, controlling discharge of a battery based on the discharge control amount at the dischargeable segment and measuring an actually discharged actual discharge energy amount; and controlling regenerative braking of a battery based on a regeneration control amount at the regenerable segment and measuring actually regenerated entire regeneration energy amount.

11 Claims, 5 Drawing Sheets

(51) Int. Cl.

| | | |
|---|---|---|
| *B60L 7/18* | (2006.01) | |
| *B60L 7/14* | (2006.01) | |
| *B60L 11/14* | (2006.01) | |
| *B60L 11/18* | (2006.01) | |
| *B60L 15/20* | (2006.01) | |

(52) U.S. Cl.
CPC ..... *B60L 2240/12* (2013.01); *B60L 2240/421* (2013.01); *B60L 2240/423* (2013.01); *B60L 2240/441* (2013.01); *B60L 2240/443* (2013.01); *B60L 2240/545* (2013.01); *B60L 2240/547* (2013.01); *B60L 2240/549* (2013.01); *B60L 2240/642* (2013.01); *B60L 2240/80* (2013.01); *B60L 2250/26* (2013.01); *B60L 2260/52* (2013.01); *B60L 2260/54* (2013.01); *Y02T 10/645* (2013.01); *Y02T 10/70* (2013.01); *Y02T 10/7005* (2013.01); *Y02T 10/705* (2013.01); *Y02T 10/7044* (2013.01); *Y02T 10/7077* (2013.01); *Y02T 10/7241* (2013.01); *Y02T 10/7283* (2013.01); *Y02T 10/7291* (2013.01); *Y02T 90/16* (2013.01)

(56) References Cited

FOREIGN PATENT DOCUMENTS

| | | |
|---|---|---|
| JP | 2004-101245 A | 4/2004 |
| JP | 3931457 B2 | 6/2007 |
| JP | 2012-147554 A | 8/2012 |
| KR | 10-2008-0053561 A | 6/2008 |
| KR | 10-0896216 | 4/2009 |

\* cited by examiner

METHOD AND APPARATUS FOR CONTROLLING REGENERATIVE BRAKING OF VEHICLE

CROSS-REFERENCE TO RELATED APPLICATION(S)

Pursuant to 35 U.S.C. §119(a), this application claims priority to and the benefit of Korean Patent Application No. 10-2014-0060457 filed on May 20, 2014, the entire contents of which are incorporated herein by reference.

BACKGROUND

Field of the Invention

The present invention relates to a method and an apparatus for controlling regenerative braking of a vehicle. More particularly, the present invention relates to a method and an apparatus for controlling regenerative braking of a vehicle that can control regenerative braking and discharge of a battery by estimating a regeneration and discharge energy amount based on information regarding a scheduled driving route.

Discussion of the Related Art

A hybrid vehicle may be driven by combining two or more different types of power sources efficiently. In other words, a hybrid vehicle has a power drive system that includes an engine and a motor and is driven by using both the combustion engine power and the electric power of a motor using electrical energy stored at a battery. To improve fuel consumption economy, vehicles using power generation control as well as hybrid vehicles use regenerative braking technology.

A regenerative braking system uses a portion of a braking force for power generation upon braking a vehicle. The braking force may be converted to electric energy and used to charge a battery, using a portion of the kinetic energy from the momentum of the vehicle as energy for driving a generator. Accordingly, a regenerative braking system is a system that simultaneously implements reduction of kinetic energy and generation of electrical energy. Such a regenerative braking system may increase a travel distance of a vehicle and therefore, fuel consumption may be improved and discharge of a noxious gas may be reduced.

A conventional method of controlling regenerative braking adjusts a power generation amount and a discharge amount based on a present driving state of a vehicle. However, since a conventional method and apparatus for controlling regenerative braking may not completely reflect a driving path of a vehicle, optimal charge and discharge control may be difficult to attain.

The above information disclosed in this background section is merely for enhancement of understanding of the background of the invention and therefore it may contain information that does not form the prior art that is already known in this country to a person of ordinary skill in the art.

SUMMARY

The present invention provides a method and apparatus for controlling regenerative braking of a vehicle by controlling regenerative braking and discharge of a battery by estimating a regeneration energy amount and a discharge energy amount based on information regarding a scheduled driving route. The present invention further provide a method and apparatus may calculate a study pattern of a driver using an estimated regeneration and discharge energy amount and an actually-driven regeneration and discharge energy amount.

According to an exemplary embodiment of the present invention, the method of controlling regenerative braking of a vehicle may include: receiving information regarding a scheduled driving route from a path information providing device; estimating a regenerable segment based on the information regarding the scheduled driving route; calculating a regenerable energy amount based on the regenerable segment; calculating a dischargeable energy amount based on the regenerable energy amount; determining a dischargeable segment and a discharge control amount based on the dischargeable energy amount; controlling discharge of a battery based on the discharge control amount at the dischargeable segment and measuring an actually discharged energy amount; and controlling regenerative braking of a battery based on a regeneration control amount at the regenerable segment and measuring an actually regenerated entire regeneration energy amount.

The regeneration control amount may be set based on the regenerable energy amount, the information regarding the scheduled driving route, energy information, and vehicle information. The regeneration control amount may be added or subtracted according to present deceleration of the vehicle and target deceleration calculated based on the information regarding the scheduled driving route, the vehicle information, and the energy information. The energy information may include at least one of a regenerable energy amount, an actual discharge energy amount, a time point regeneration energy amount, and a state of charge (SOC) of a battery. The time point regeneration energy amount may include a first time point regeneration energy amount that is generated by measuring a regenerated energy amount at a random time point of the regenerable segment and a second time point regeneration energy amount that is regenerated from a regenerable segment start time to a random time point based on the first time point regeneration energy amount point.

The regenerable segment may be estimated using the information regarding the scheduled driving route and a correction coefficient, and the regenerable energy amount may be calculated using the regenerable segment, the information regarding the scheduled driving route, and the correction coefficient. The correction coefficient may be reset based on the regenerable energy amount and the entire regeneration energy amount. The information regarding the scheduled driving route may include at least one of, but is not limited to slope information, curvature information, speed limit information, and real time traffic information.

Another exemplary embodiment of the present invention provides an apparatus for controlling regenerative braking of a vehicle that is configured to connect to a path information providing device. The apparatus may include: a motor controller configured to operate driving and torque of a motor; a battery management system configured to manage and adjust a charge and discharge state of a battery; and a vehicle controller configured to integrally operate the motor controller and the battery management system via a network. Further, the vehicle controller is configured to estimate a regenerable segment based on information regarding the scheduled driving route that is received from the path information providing device, determine a regeneration control amount at the regenerable segment, operate the battery management system based on the regeneration control amount at the regenerable segment, and measure an actually regenerated entire regeneration energy amount at the regenerable segment.

A method and apparatus for controlling regenerative braking of a vehicle according to an exemplary embodiment of the present invention may be configured to estimate a regeneration and discharge energy amount based on information regarding the scheduled driving route and thus charge and discharge control of a battery may be performed in an improved state. Further, a method and apparatus according to an exemplary embodiment of the present invention may improve accuracy of estimation of regeneration energy and discharge energy using a calculated study pattern of a driver using an estimated regeneration and discharge energy amount and an actually driven regeneration and discharge energy amount.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
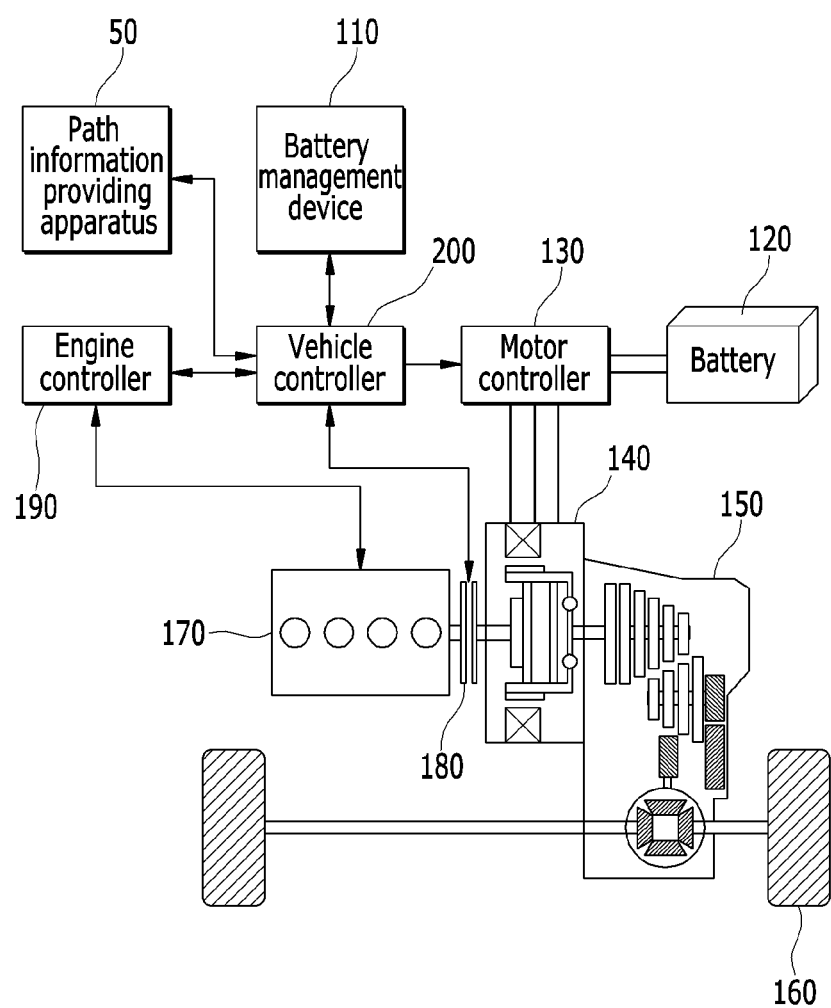
FIG. 1 is an exemplary diagram illustrating a regenerative braking control apparatus of a vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiments are described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Further, detailed descriptions of well-known functions and structures incorporated herein may be omitted to avoid obscuring the subject matter of the present invention. The terms used herein are defined according to the functions of the present invention and may vary depending on a user's or an operator's intension and usage. Therefore, the terms used herein should be understood based on the descriptions made herein. Further, in order to effectively describe technical characteristics of the present invention, the following exemplary embodiment may appropriately change, integrate, or separate terms to be clearly understood by a person of ordinary skill in the art and the present invention is not limited thereto.

Hereinafter, an exemplary embodiment of the present invention will be described in detail with reference to the accompanying drawings. FIG. 1 is an exemplary diagram illustrating a regenerative braking control apparatus of a vehicle according to an exemplary embodiment of the present invention. Referring to FIG. 1, a regenerative braking control apparatus of the vehicle may be connected to a path information providing device 50 and include a battery management system 110, a battery 120, a motor controller 130, a motor 140, a transmission 150, a driving wheel 160, an engine 170, an engine clutch 180, an engine controller 190, and a vehicle controller 200.

The path information providing device 50 may be configured to generate information regarding a scheduled driving route from a starting point to a destination and provide the generated information regarding the scheduled driving route to the vehicle controller 200. The information regarding the scheduled driving route may include, but is not limited to: at least one of slope information, curvature information, speed limit information, and real time traffic information of a driving scheduled road.

Such a path information providing device 50 may be mounted within the vehicle or may be a separate apparatus (e.g., the path information providing device 50 may be built into a dashboard or instrument cluster of a vehicle, or a portable device). Further, the path information providing device 50 may include any type of apparatus that may provide information regarding the scheduled driving route from a starting point to a destination to the vehicle controller 200. For example, the path information providing device 50 may be any one of, but is not limited to a mobile communication terminal, a mobile computer such as a tablet personal computer (PC), a laptop computer, and a netbook, and a navigation device.

The battery management system 110 may be configured to comprehensively detect information such as a voltage, a current, and a temperature of the battery 120 to manage and control a charge state, and may be executed by the vehicle controller 200 to adjust a state of charge (SOC) and a regeneration and discharge energy amount of the battery 120 to reduce a likelihood that the battery 120 may become over-discharged to a substantially low limited voltage or less or may become overcharged to a substantially high limited voltage or more. It should be understood that a limited voltage refers to a voltage that prevents an overcharge or an over-discharge of the battery. The battery management system 110 may be configured to provide information regarding the battery 120 to the vehicle controller 200 via a network. The battery 120 may be configured to supply power to the motor 140 in a Hybrid Electric Vehicle (HEV) mode or an Electric Vehicle (EV) mode and may be charged with electricity recovered through the motor 140 upon regenerative braking. The motor controller 130 may be configured to adjust driving and torque of the motor 140 according to the vehicle controller 200 and store electricity generated in the motor 140 at the battery 120 upon regenerative braking.

One microprocessor or a plurality of microprocessors may be provided in the motor controller 130, and the one microprocessor or the plurality of microprocessors may operate by a predetermined program for controlling the motor 140. The motor 140 may be executed by the motor controller 130 to generate a driving torque and may be operated as a generator in a coast down driving state to supply regeneration energy to the battery 120. The transmission 150 may be executed by the vehicle controller 200 to adjust a shift ratio, and distribute an output torque that may be added (e.g., by summing engine and motor torques) and applied through the engine clutch 180 according to a driving mode with a shift ratio, and transfer the output torque to the driving wheel 160, thereby enabling the vehicle to drive. The transmission 150 may be, but is not limited to, an automatic transmission 150 or a continuously variable transmission 150.

An output of the engine 170 may be adjusted by the engine controller 190, and driving thereof may be adjusted to a substantially optimal driving point by the engine controller 190. The engine clutch 180 may be disposed between the engine 170 and the motor 140 and may be operated by the vehicle controller 200 to switch power delivery between the engine 170 and the motor 140. The engine controller 190 may be connected to the vehicle controller 200 via a network, and may be configured to operate the engine 170 by interlocking with the vehicle controller 200, and provide operation state information of the engine 170 to the vehicle controller 200. The one microprocessor or the plurality of microprocessors maybe configured to operate by a predetermined program for controlling the engine 170. The vehicle controller 200 may be an uppermost controller and may be configured to operate subordinate controllers that are connected to a network and collect and analyze information of each subordinate controller to operate of the vehicle. The vehicle controller 200 may be configured to estimate a regenerable segment based on information regarding the scheduled driving route that is received from the path information providing device 50, determine a regeneration control amount at the regenerable segment, and adjust regenerative braking of the battery 120 based on a regeneration control amount at the regenerable segment. Further, the vehicle controller 200 may be configured to seta dischargeable segment and a discharge control amount based on information regarding the scheduled driving route and a regenerable energy amount and operate discharge of a battery based on a discharge control amount at the dischargeable segment. The one microprocessor or the plurality of microprocessors may be configured to operate by a predetermined program for controlling regenerative braking of the vehicle. The predetermined program may be configured to perform each step of a method of controlling regenerative braking of a vehicle according to an exemplary embodiment of the present invention.

Figure 2:
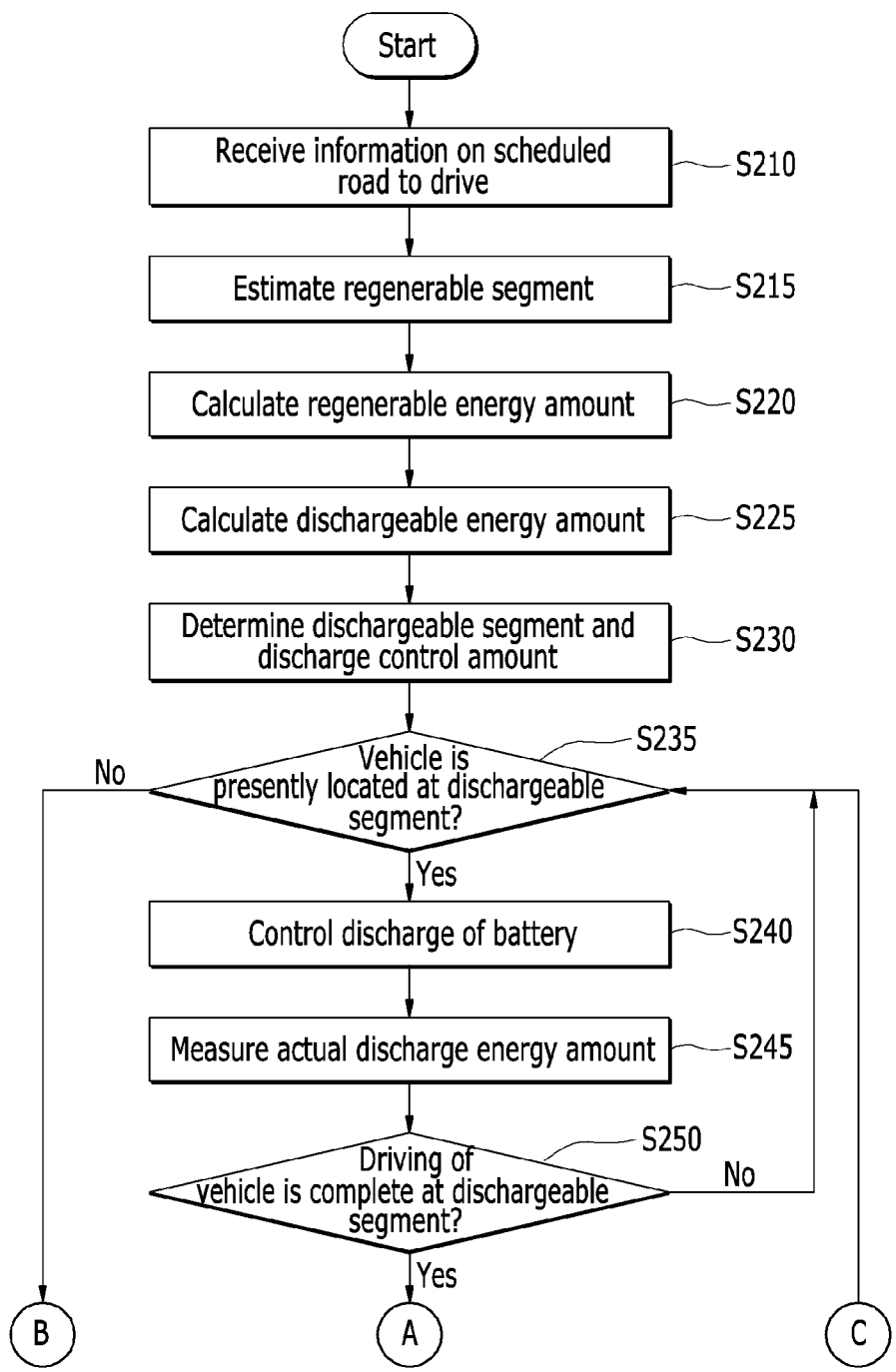
FIGS. 2 and 3 are exemplary flowcharts illustrating a method of controlling regenerative braking in a vehicle according to an exemplary embodiment of the present invention.
Figure 3:
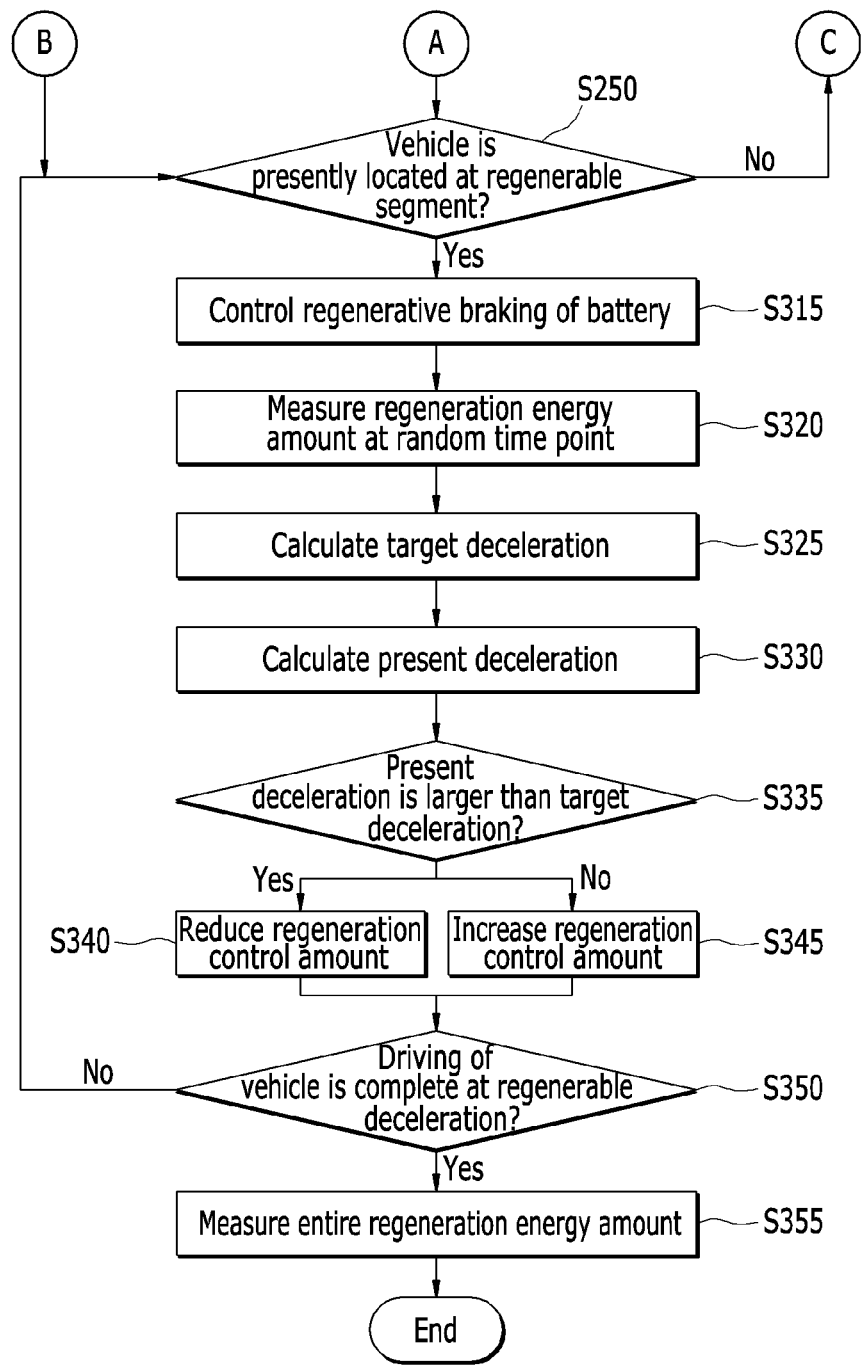

Hereinafter, a method of controlling regenerative braking of a vehicle according to an exemplary embodiment of the present invention will be described in detail with reference to FIGS. 2 and 3. FIGS. 2 and 3 are exemplary flowcharts illustrating a method of controlling regenerative braking in a vehicle according to an exemplary embodiment of the present invention. Referring to FIGS. 2 and 3, the vehicle controller 200 may be configured to receive information regarding the scheduled driving route representing information regarding driving on a particular road from a starting point to a destination from the path information providing device 50 (S210). In particular, before driving is started, the vehicle controller 200 may be configured to receive information regarding the scheduled driving route from the path information providing device 50.

The vehicle controller 200 may be configured to estimate a regenerable segment based on slope information, curvature information, speed limit information, and real time information included in information regarding the scheduled driving route (S215). In particular, the regenerable segment may represent a segment that may be used to perform regenerative braking, (e.g., a downward slope in a road).

Figure 4:
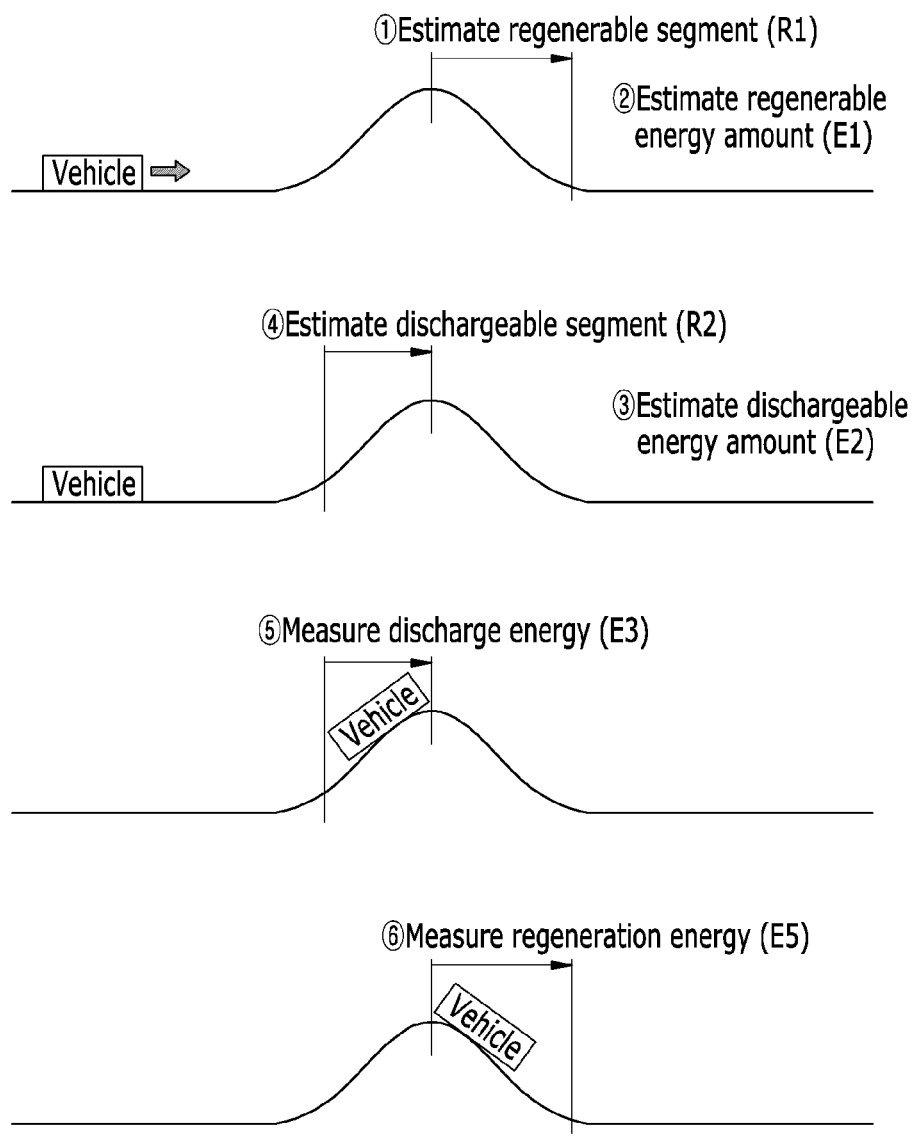
FIG. 4 is an exemplary diagram illustrating a method of controlling regenerative braking according to an exemplary embodiment of the present invention.

FIG. 4 is an exemplary diagram illustrating a method of controlling regenerative braking according to an exemplary embodiment of the present invention. For example, as shown in FIG. 4, the vehicle controller 200 may be configured to estimate a regenerable segment R1 using information regarding the scheduled driving route. The vehicle controller 200 may be configured to calculate a regenerable energy amount using information regarding the scheduled driving route, a regenerable segment, and a correction coefficient (S220). In particular, the regenerable energy amount may represent an energy amount of the battery 120 that may be replenished or charged at a regenerable segment.

For example, as shown in FIG. 4, the vehicle controller 200 may be configured to calculate a regenerable energy amount E1. The vehicle controller 200 may be configured to calculate a dischargeable energy amount based on a regenerable energy amount and a correction coefficient (S225). In other words, by multiplexing a regenerable energy amount and a correction coefficient, the vehicle controller 200 may be configured to calculate a dischargeable energy amount E2, as shown in FIG. 4.

The vehicle controller 200 may be configured to estimate a dischargeable segment using a dischargeable energy amount and information regarding the scheduled driving route and determine a discharge control amount based on the dischargeable energy amount, information regarding the scheduled driving route, and vehicle information (S230). Further, the dischargeable segment may represent a segment that should use a voltage of the battery 120, (e.g., a hill), and the dischargeable energy amount may represent an energy amount of the battery 120 that may be used at a dischargeable segment. The vehicle information may include a brake hydraulic pressure, a speed of the vehicle, and a gear stage. For example, as shown in FIG. 4, the vehicle controller 200 may be configured to estimate a dischargeable segment R2 and a dischargeable energy amount E2.

When the vehicle starts to drive, the vehicle controller 200 may be configured to determine whether the vehicle is presently located at a dischargeable segment (S235). When the vehicle is presently located at a dischargeable segment, the vehicle controller 200 may be configured to execute discharge of the battery 120 based on a discharge control amount (S240). The vehicle controller 200 may be configured to actually measure a discharged amount of the battery 120 within the dischargeable segment to generate an actual discharge energy amount (S245). For example, the vehicle controller 200 may be configured to measure an actual discharge energy amount E3 at the dischargeable segment.

When the vehicle is not presently located at a dischargeable segment at 235, the vehicle controller 200 may be configured to determine whether the vehicle is presently located at a regenerable segment (S310). The vehicle controller 200 may be configured to determine whether driving of the vehicle is complete at a dischargeable segment (S250). When driving of the vehicle is complete at a dischargeable segment, the vehicle controller 200 may be configured to determine whether the vehicle is presently located at a regenerable segment (S310). When driving of the vehicle is not complete at a dischargeable segment, the process may return to S235 and the vehicle controller 200 may be configured to determine whether the vehicle is presently located at a dischargeable segment (S235).

When the vehicle is presently located at a regenerable segment at S310, the vehicle controller 200 may be configured to operate the battery management system 110 to execute regenerative braking of the battery 120 (S315). Specifically, the vehicle controller 200 may be configured to seta regeneration control amount using a regenerable energy amount, vehicle information, road information, and energy information. In particular, the energy information may include a regenerable energy amount, an actual discharge energy amount, and an SOC of the battery 120. Further, the energy information may further include first and second time point regeneration energy amounts to be calculated at S320. The vehicle controller 200 may be configured to execute regenerative braking of the battery 120 based on a regeneration control amount.

The vehicle controller 200 may be configured to measure an actually regenerated first time point regeneration energy amount at a random time point within a regenerable segment (S320). In particular, the first time point regeneration energy amount may be an energy amount generated by measuring energy that is regenerated in a battery in real time, in a present vehicle. The vehicle controller 200 may be configured to calculate a second time point regeneration energy amount that is regenerated from a regeneration segment start time point to a random time point based on the first time point regeneration energy amount. In order words, the vehicle controller 200 may be configured to calculate a second time point regeneration energy amount regenerated in a battery from a location at which a regeneration segment starts to a location at which the vehicle is presently located.

Specifically, vehicle controller 200 may be configured to calculate a second time point regeneration energy amount using Equation 1.

$$E4 = \int_{t=0}^{s} E(t)dt \quad \text{Equation 1}$$

where E(t) represents a first time point regeneration energy amount, s represents a time in which the vehicle has arrived from a regeneration segment start time point to a segment at which the vehicle is presently located, and E4 represents a second time point regeneration energy amount. The second time point regeneration energy amount may represent an energy amount regenerated in a battery from a location at which a regeneration segment starts to a location at which the vehicle is presently located.

The vehicle controller 200 may be configured to calculate target deceleration using vehicle information, energy information, and driving road information (S325). The energy information may include at least one of a regenerable energy amount, an actual discharge energy amount, and a second time point regeneration energy amount that is calculated at S320. The vehicle controller 200 may be configured to calculate present deceleration of the vehicle using a speed and an acceleration value of the vehicle (S330). The vehicle controller 200 may be configured to determine whether present deceleration is greater than target deceleration (S335).

When present deceleration is greater than target deceleration, the vehicle controller 200 may be configured to reduce a regeneration control amount (S340). In other words, the vehicle controller 200 may be configured to execute regenerative braking of the battery 120 based on the reduced regeneration control amount. When present deceleration is equal to or less than target deceleration, the vehicle controller 200 may be configured to increase a regeneration control amount (S345). In other words, the vehicle controller 200 may be configured to control regenerative braking of the battery 120 based on the increased regeneration control amount.

The vehicle controller 200 may be configured to determine whether driving of the vehicle is complete at a regenerable segment (S350). When driving of the vehicle is complete at a regenerable segment, the vehicle controller 200 may be configured to measure an entire regeneration energy amount of an energy amount that is charged at the battery 120 at the regenerable segment (S355). For example, as shown in FIG. 4, the vehicle controller 200 may be configured to measure an entire regeneration energy amount E5 at the regenerable segment R1. When driving of the vehicle is not complete at a regenerable segment, the process may return to S310 and the vehicle controller 200 may be configured to determine whether the vehicle is presently located at a regenerable segment. Thereafter, the vehicle controller 200 may be configured to determine whether driving of the vehicle is complete based on information regarding the scheduled driving route, and when driving of the vehicle is not complete, by returning to S235, the process may be performed from S235. Further, when driving of the vehicle is complete, the vehicle controller 200 may be configured to terminate regenerative braking control.

Figure 5:
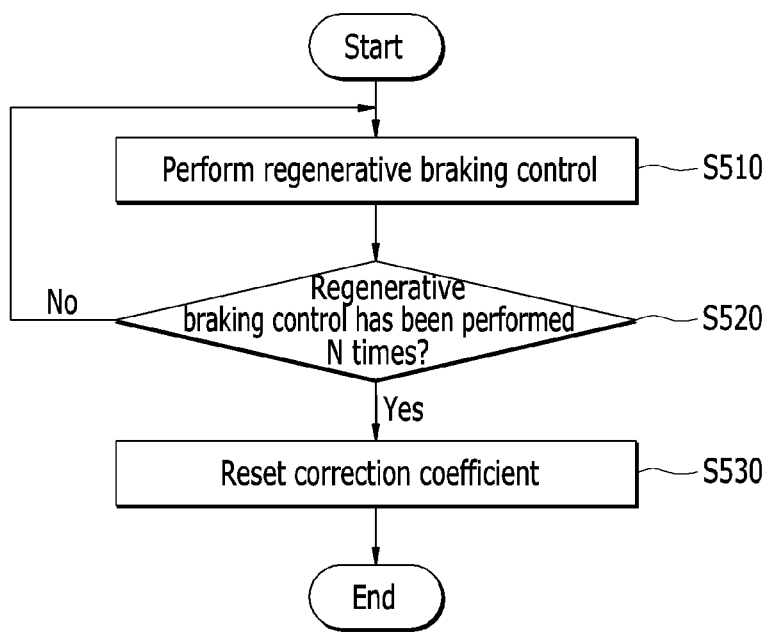
FIG. 5 is an exemplary flowchart illustrating a method of setting a correction coefficient according to an exemplary embodiment of the present invention.

FIG. 5 is an exemplary flowchart illustrating a method of setting a correction coefficient according to an exemplary embodiment of the present invention. As shown in FIG. 5, the vehicle controller 200 may be configured to perform regenerative braking control corresponding to S210 to S355 of FIGS. 2 and 3 (S510). The vehicle controller 200 may be configured to determine whether regenerative braking control has been performed the randomly preset N times (S520). When regenerative braking control has been performed the randomly preset N times, the vehicle controller 200 may be configured to reset a correction coefficient based on a regenerable energy amount and an entire regeneration energy amount (S530).

In other words, the vehicle controller 200 may be configured to calculate a correction coefficient using Equation 2.

$$r = \frac{\sum_{i=1}^{n} E5(i)}{\sum_{j=1}^{n} E1(j)} \quad \text{Equation 2}$$

where E5 represents an entire regeneration energy amount, E1 represents a regenerable energy amount, and n represents a randomly preset integer. In particular, E1 is a regenerable energy amount that is calculated at S220 of FIG. 2. The regenerable energy amount may be calculated by estimating an energy amount that can charge at a regenerable segment. E5 is an entire regeneration energy amount that is measured at S355 of FIG. 3. The entire regeneration energy amount may be an energy amount that is actually charged at a battery at a regenerable segment.

The vehicle controller 200 may be configured to calculate a correction coefficient and reset a preset correction coefficient to a calculated correction coefficient. Therefore, accuracy of estimation of regeneration or discharge energy may be improved through study of a correction coefficient. When regenerative braking control has not performed the randomly preset N times at S520, the process may return to S510 and the vehicle controller 200 may be configured to perform regenerative braking control corresponding to S210 to S355 of FIGS. 2 and 3.

DESCRIPTION OF SYMBOLS

50: path information providing device
110: battery management system
120: battery
130: motor controller
140: motor
150: transmission
160: driving wheel
170: motor
180: engine clutch
190: engine controller
200: vehicle controller While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A method of controlling regenerative braking of a vehicle comprising:
   receiving, by a controller, information regarding a scheduled driving route from a path information providing device;
   estimating, by the controller, a regenerable segment based on the information regarding the scheduled driving route and calculating a regenerable energy amount based on the regenerable segment;
   calculating, by the controller, a dischargeable energy amount based on the regenerable energy amount and determining a dischargeable segment and a discharge control amount based on the dischargeable energy amount;
   adjust, by the controller, discharge of a battery based on the discharge control amount at the dischargeable segment and measuring an actually discharged energy amount; and
   executing, by the controller, regenerative braking of the vehicle based on a regeneration control amount at the regenerable segment and measuring an actually regenerated entire regeneration energy amount,
   wherein the executing of regenerative braking of the battery includes:
      calculating, by the controller, target deceleration based on the scheduled driving route, vehicle information, and energy information,
      calculating, by the controller, present deceleration of the vehicle using a speed and an acceleration value of the vehicle, and
      reducing, by the controller, the regeneration control amount when the present deceleration is greater than the target deceleration and increasing the regeneration control amount when the present deceleration is equal to or less than the target deceleration,
   wherein the vehicle information includes at least one selected from the group consisting of: a brake hydraulic pressure, a speed of the vehicle, and a gear stage,
   wherein the energy information includes at least one selected from the group consisting of: a regenerable energy amount, an actual discharge energy amount, a time point regeneration energy amount, and a State Of Charge (SOC) of a battery, and
   wherein the time point regeneration energy amount includes a first time point regeneration energy amount generated by measuring a regenerated energy amount at a random time point of the regenerable segment and a second time point regeneration energy amount generated from a regenerable segment start time to a random time point based on the first time point regeneration energy amount point.

2. The method of claim 1, wherein the regenerable segment is estimated using the information regarding the scheduled driving route and a correction coefficient, and the regenerable energy amount is calculated using the regenerable segment, the information regarding the scheduled driving route, and the correction coefficient.

3. The method of claim 2, wherein the correction coefficient is reset based on the regenerable energy amount and the entire regeneration energy amount.

4. The method of claim 1, wherein the information regarding the scheduled driving route includes at least one selected from the group consisting of: slope information, curvature information, speed limit information, and real time traffic information.

5. An apparatus for controlling regenerative braking of a vehicle that connects to a path information providing device, the regenerative braking control apparatus comprising:
   a vehicle controller configured to integrally operate a motor controller and a battery management system with a network,
   wherein the motor controller is configured to adjust driving and torque of a motor and the battery management system is configured to adjust a charge and discharge state of a battery,
   wherein the vehicle controller is configured to estimate a regenerable segment based on information regarding a scheduled driving route received from the path information providing device, determine a regeneration control amount at the regenerable segment, control the battery management system based on the regeneration control amount at the regenerable segment, and measure an actually regenerated entire regeneration energy amount at the regenerable segment,
   wherein the vehicle controller is further configured to calculate target deceleration based on the scheduled driving route, vehicle information, and energy information, calculate present deceleration of the vehicle using a speed and an acceleration value of the vehicle, and reduce the regeneration control amount when the present deceleration is greater than the target deceleration and increase the regeneration control amount when the present deceleration is equal to or less than the target deceleration, wherein the vehicle information includes at least one selected from the group consisting of: a brake hydraulic pressure, a speed of the vehicle, and a gear stage, wherein the energy information includes at least one selected from the group consisting of: a regenerable energy amount, an actual discharge energy amount, a time point regeneration energy amount, and a State Of Charge (SOC) of a battery, and wherein the time point regeneration energy amount includes a first time point regeneration energy amount generated by measuring a regenerated energy amount at a random time point of the regenerable segment and a second time point regeneration energy amount regenerated from a regenerable segment start time to a random time point based on the first time point regeneration energy amount point.

6. The apparatus of claim 5, wherein the vehicle controller is configured to calculate a dischargeable energy amount using a regenerable energy amount calculated based on the regenerable segment and determine a dischargeable segment and a discharge control amount based on the dischargeable energy amount.

7. The apparatus of claim 6, wherein the dischargeable energy amount is calculated by multiplexing the regenerable energy amount and a correction coefficient, and the correction coefficient is reset based on the regenerable energy amount and the entire regeneration energy amount.

8. The apparatus of claim 6, wherein the vehicle controller is configured to adjust discharge of the battery based on the discharge control amount at the dischargeable segment and measure an actually discharged energy amount at the dischargeable segment.

9. A non-transitory computer readable medium containing program instructions executed by a processor or controller for controlling regenerative braking of a vehicle, the computer readable medium comprising:

program instructions that estimate a regenerable segment based on the information regarding the scheduled driving route and calculating a regenerable energy amount based on the regenerable segment;

program instructions that calculate a dischargeable energy amount based on the regenerable energy amount and determining a dischargeable segment and a discharge control amount based on the dischargeable energy amount;

program instructions that adjust discharge of a battery based on the discharge control amount at the dischargeable segment and measuring an actually discharged energy amount; and program instructions that execute regenerative braking of a battery based on a regeneration control amount at the regenerable segment and measuring an actually regenerated entire regeneration energy amount, wherein the program instructions that execute regenerative braking of the battery include:

program instructions that calculate target deceleration based on the scheduled driving route, vehicle information, and energy information, program instructions that calculate present deceleration of the vehicle using a speed and an acceleration value of the vehicle, and program instructions that reduce the regeneration control amount when the present deceleration is greater than the target deceleration and increase the regeneration control amount when the present deceleration is equal to or less than the target deceleration, wherein the vehicle information includes at least one selected from the group consisting of: a brake hydraulic pressure, a speed of the vehicle, and a gear stage, wherein the energy information includes at least one selected from the group consisting of: a regenerable energy amount, an actual discharge energy amount, a time point regeneration energy amount, and a State Of Charge (SOC) of a battery, and wherein the time point regeneration energy amount includes a first time point regeneration energy amount generated by measuring a regenerated energy amount at a random time point of the regenerable segment and a second time point regeneration energy amount regenerated from a regenerable segment start time to a random time point based on the first time point regeneration energy amount point.

10. The non-transitory computer readable medium of claim 9 wherein the regenerable segment is estimated using the information regarding the scheduled driving route and a correction coefficient, and the regenerable energy amount is calculated using the regenerable segment, the information regarding the scheduled driving route, and the correction coefficient, and wherein the correction coefficient is reset based on the regenerable energy amount and the entire regeneration energy amount.

11. The non-transitory computer readable medium of claim 9 wherein the information regarding the scheduled driving route includes at least one selected from the group consisting of slope information, curvature information, speed limit information, and real time traffic information.

* * * * *